(No Model.)

W. P. BRACHMANN.
NUT LOCK.

No. 467,627. Patented Jan. 26, 1892.

Witnesses
Oscar A. Michel
E. Igler

Inventor
William P. Brachmann,
By Drake & Co. Atty's.

THE NORRIS PETERS CO., PHOTO-LITHO., WASHINGTON, D. C.

UNITED STATES PATENT OFFICE.

WILLIAM P. BRACHMANN, OF NEWARK, NEW JERSEY.

NUT-LOCK.

SPECIFICATION forming part of Letters Patent No. 467,627, dated January 26, 1892.

Application filed June 1, 1891. Serial No. 394,804. (No model.)

*To all whom it may concern:*

Be it known that I, WILLIAM P. BRACHMANN, a citizen of the United States, residing at Newark, in the county of Essex and State of New Jersey, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to secure a more perfect lock, to reduce the cost of construction, and to secure certain specific advantages, which will be referred to in connection with the description of the working parts.

The invention consists in the improved lock-washer and in the arrangements and combinations of parts, substantially as will be hereinafter set forth, and finally embodied in the clauses of the claim.

Figure 1:
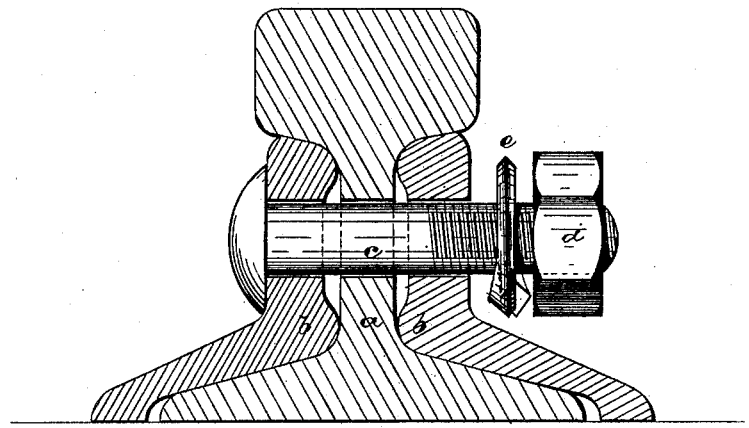
Figure 2:
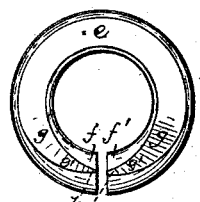
Figure 3:
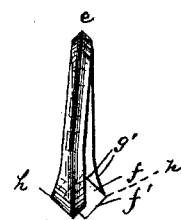
Figure 4:
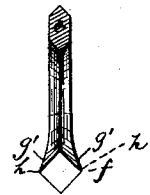
Figure 5:
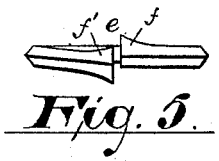

Referring to the accompanying drawings, in which like letters indicate corresponding parts in each of the several figures, Figure 1 is a sectional view of a railway-rail to which my improvements have been applied. Fig. 2 is a plan. Figs. 3 and 5 are edge views, and Fig. 4 is a sectional view of the improved lock-washer.

In said drawings, $a$ indicates a rail; $b$, the fish-plates; $c$, a bolt, and $d$ the nut to be locked.

$e$ indicates the improved lock-washer, which is ordinarily arranged on the bolt between the nut and the fish-plate or other part in any suitable manner. The body of the washer is flat, as indicated in Fig. 4, it having, however, a slight spiral twist, as indicated in Figs. 1, 3, and 5, so that the ends $f f'$ will lie out of a plane with the body, as will be understood, to secure the desired spring action. One of the ends of the washer is of a diamond shape, the flat faces $g$ being formed on inclines $g'$, (shown in Fig. 5,) and contracting to points, as shown in Fig. 2, so that indenting-points $h$, Fig. 4, are formed on opposite sides of one of the ends at points midway between the inner and outer edges of the ring, adapted to bite into both of the adjacent parts, and thus more effectually prevent the nut from turning. The other end $f$ has a biting-point on but one of the sides, so that there will be no danger of the washer biting into the nut and preventing it from being turned to tighten the bolt, the biting-point on the side toward the nut admitting of the nut being "screwed up," but not "unscrewed."

What I claim as new is—

The improved lock-washer herein described, combining therein a flat washer slightly spiral in shape, the ends of which are enlarged and inclined and forming biting-points on both sides of one of said ends and on one side only of the other, substantially as shown and described.

In testimony that I claim the foregoing I have hereunto set my hand this 18th day of May, 1891.

WILLIAM P. BRACHMANN.

Witnesses:
OSCAR A. MICHEL,
OLIVER DRAKE.